United States Patent
Gouda et al.

(10) Patent No.: US 9,591,732 B1
(45) Date of Patent: Mar. 7, 2017

(54) METHOD FOR LIGHTING HIGH-PRESSURE DISCHARGE LAMP

(71) Applicant: Phoenix Electric Co., Ltd., Himeji-shi, Hyogo (JP)

(72) Inventors: Tetsuya Gouda, Himeji (JP); Shinichi Ushijima, Himeji (JP)

(73) Assignee: PHOENIX ELECTRIC CO., LTD., Himeji-Shi (JP)

( * ) Notice: Subject to any disclaimer, the term of this patent is extended or adjusted under 35 U.S.C. 154(b) by 0 days.

(21) Appl. No.: 15/079,978

(22) Filed: Mar. 24, 2016

(30) Foreign Application Priority Data

Oct. 19, 2015 (JP) .................................. 2015-205782

(51) Int. Cl.
| | |
|---|---|
| H05B 41/36 | (2006.01) |
| H01J 61/82 | (2006.01) |
| H05B 37/02 | (2006.01) |
| H01J 61/20 | (2006.01) |

(52) U.S. Cl.
CPC ............. H05B 41/36 (2013.01); H01J 61/822 (2013.01); H05B 37/0227 (2013.01); *H01J 61/20* (2013.01)

(58) Field of Classification Search
CPC .......... H01J 61/20; H01J 61/26; H01J 61/822; H01J 61/125
USPC ............... 315/358, 363, 334, 326, 337, 117; 313/564, 565, 566, 567, 637, 638, 313/639–643
See application file for complete search history.

(56) References Cited

U.S. PATENT DOCUMENTS

| | | | |
|---|---|---|---|
| 2004/0021418 A1* | 2/2004 | Takahashi | H01J 61/26 313/635 |
| 2006/0152160 A1 | 7/2006 | Fischer et al. | |
| 2010/0002200 A1 | 1/2010 | Pekarski | |
| 2015/0123543 A1* | 5/2015 | Nakagawa | H05B 41/2928 315/117 |

FOREIGN PATENT DOCUMENTS

| | | |
|---|---|---|
| JP | 2006520075 A | 8/2006 |
| JP | 2008527405 A | 7/2008 |

* cited by examiner

*Primary Examiner* — Tuyet Vo
(74) *Attorney, Agent, or Firm* — Lucas & Mercanti LLP

(57) ABSTRACT

A method for lighting a high-pressure discharge lamp that is configured to change a power to be supplied to the high-pressure discharge lamp in accordance with a luminance parameter of an image content is disclosed. In the method, halogen is encapsulated in an internal space of an arc tube part of the high-pressure discharge lamp with an excessive volume with respect to a capacity of the internal space such that a halogen cycle is established when part of mercury deposits without vaporizing, and the internal space is configured to be kept at a higher temperature than a blackening temperature that is lower than a deposition temperature of the mercury and causes remarkable blackening on an inner wall of the arc tube part.

6 Claims, 2 Drawing Sheets

FIG. 2

METHOD FOR LIGHTING HIGH-PRESSURE DISCHARGE LAMP

CROSS REFERENCE TO RELATED APPLICATION

This application claims the priority of Japanese Patent Application No. 2015-205782 filed on Oct. 19, 2015, which is incorporated by reference herein.

BACKGROUND OF THE INVENTION

Field of the Invention

The present invention relates to a method for lighting a high-pressure discharge lamp whereby it is possible to avoid occurrence of remarkable blackening on the inner wall of an arc tube part of the high-pressure discharge lamp.

Background Art

A high-pressure discharge lamp is characterized in that quite a large amount of light is obtainable from one high-pressure discharge lamp. Therefore, the high-pressure discharge lamp has been widely used for a projector and so forth. In the high-pressure discharge lamp, a pair of electrodes is mounted in the internal space of an arc tube part made of silica glass, and also, mercury is encapsulated in the internal space. When voltage is applied to the pair of electrodes, an arc discharge is generated. Accordingly, evaporated mercury is excited and emits light.

SUMMARY OF THE INVENTION

Publication of Japanese translation of PCT international application No. JP-A-2008-527405 discloses a technology for providing a projector configured to be capable of obtaining high contrast. In the technology, a high-pressure discharge lamp is configured to be switched between "a saturation operating mode" and "an unsaturation operating mode" in at least part of the entire operating time by changing power to be supplied to the high-pressure discharge lamp in accordance with a luminance parameter of an image content. In the saturation operating mode, mercury tends to deposit (condense) within the arc tube part of the high-pressure discharge lamp. In the unsaturation operating mode, mercury tends to evaporate entirely within the arc tube part.

Such configuration of switching between "the saturation operating mode" and "the unsaturation operating mode" is required due to the following reason. When a large volume of mercury deposits within the arc tube part in the saturation operating mode, this will be a cause of occurrence of blackening on the inner wall of the arc tube part. Further, such blackening shields light emitted from an arc discharge region, and results in degradation in luminosity and local temperature increase within the arc tube part. Consequently, these may cause burst and damage of the arc tube part.

Therefore, when the saturation operating mode is continued for a long period of time whereby a dark scene, for instance, continues for a long period of time, it has been required to temporarily drive the high-pressure discharge lamp in the unsaturation operating mode regardless of the luminance parameter of the image content in order to prevent occurrence of blackening. However, when power to be supplied to the high-pressure discharge lamp increases even temporarily in "the dark scene" that the value of the luminance parameter is small, this inevitably results in a condition that good contrast cannot be obtained. Hence, development of a technology for solving the aforementioned drawback has been awaited.

The present invention has been developed in view of the aforementioned drawback of the well-known art. Therefore, it is a main object of the present invention to provide a method for lighting a high-pressure discharge lamp, which is configured to determine power to be supplied to the high-pressure discharge lamp in accordance with a luminance parameter of an image content, whereby good contrast can be always obtained without temporarily changing a saturation operating mode into an unsaturation operating mode even when the saturation operating mode continues for a long period of time.

(1) According to an aspect of the present invention, a method for lighting a high-pressure discharge lamp is provided that is configured to change a power to be supplied to the high-pressure discharge lamp in accordance with a luminance parameter of an image content. The method is characterized in that the high-pressure discharge lamp includes an arc tube part having an internal space in which a pair of electrodes is disposed in opposition to each other and in which mercury and halogen are encapsulated. Additionally, the halogen is encapsulated in the internal space with an excessive volume with respect to a capacity of the internal space such that a halogen cycle is established when part of the mercury deposits without vaporizing. Moreover, the internal space is configured to be kept at a higher temperature than a blackening temperature that is lower than a deposition temperature of the mercury and causes remarkable blackening on an inner wall of the arc tube part.

(2) On the other hand, according to another aspect of the present invention, a method for lighting a high-pressure discharge lamp is provided that is configured to change a power to be supplied to the high-pressure discharge lamp in accordance with a luminance parameter of an image content. The method is characterized in that the high-pressure discharge lamp includes an arc tube part having an internal space in which a pair of electrodes is disposed in opposition to each other and in which mercury and halogen are encapsulated. Additionally, the halogen is encapsulated in the internal space with an excessive volume with respect to a capacity of the internal space such that a halogen cycle is established when part of the mercury deposits without vaporizing. Moreover, the internal space is configured to be kept at a higher temperature than a blackening temperature, which is lower than a deposition temperature of the mercury and causes remarkable blackening on an inner wall of the arc tube part, by setting a lowest power to be supplied to the high-pressure discharge lamp to be greater than or equal to a predetermined percentage of a rated power set for the high-pressure discharge lamp.

(3) It is preferable that in the high-pressure discharge lamp, an encapsulated rate of the mercury is greater than or equal to 0.27 mg/mm$^3$ and less than or equal to 0.45 mg/mm$^3$ and an encapsulated rate of the halogen is greater than or equal to 1×10$^{-4}$ μmol/mm$^3$ and less than or equal to 30×10$^{-4}$ μmol/mm$^3$, and that the lowest power is set to be greater than or equal to 33% of the rated power set for the high-pressure discharge lamp.

(4) It is preferable that in the high-pressure discharge lamp, the encapsulated rate of the mercury is greater than or equal to 0.27 mg/mm$^3$ and less than or equal to 0.36 mg/mm$^3$ and the encapsulated rate of the halogen is greater than or equal to 5×10$^{-4}$ μmol/mm$^3$ and less than or equal to $20 \times 10^{-4}$ µmol/mm³, and the lowest power is set to be greater than or equal to 25% of the rated power set for the high-pressure discharge lamp.

(5) It is preferable that in the high-pressure discharge lamp, the encapsulated rate of the mercury is greater than or equal to 0.27 mg/mm³ and less than or equal to 0.33 mg/mm³ and the encapsulated rate of the halogen is greater than or equal to $5 \times 10^{-4}$ µmol/mm³ and less than or equal to $10 \times 10^{-4}$ µmol/mm³, and the lowest power is set to be greater than or equal to 21% of the rated power set for the high-pressure discharge lamp.

(6) It is preferable that in the high-pressure discharge lamp, the encapsulated rate of the mercury is greater than or equal to 0.33 mg/mm³ and less than or equal to 0.36 mg/mm³ and the encapsulated rate of the halogen is greater than or equal to $10 \times 10^{-4}$ µmol/mm³ and less than or equal to $20 \times 10^{-4}$ µmol/mm³, and the lowest power is set to be greater than or equal to 17% of the rated power set for the high-pressure discharge lamp.

In a lighting state that part of the mercury deposits (condenses) within the arc tube part of the high-pressure discharge lamp (i.e., a saturation operating mode), the halogen encapsulated in the arc tube part is inevitably bound into the deposited mercury. Hence, in the internal space of the arc tube part, the volume of the halogen contributable to a halogen cycle is reduced by the volume of the deposited mercury. Thus, the halogen cycle is blocked by reduction in volume of the halogen. This is a cause of occurrence of remarkable blackening on the inner wall of the arc tube part.

Regarding the aforementioned blackening, inventors of the present invention found that even when the temperature of the internal space of the arc tube part of the high-pressure discharge lamp became lower than the deposition temperature of the mercury and this resulted in a partially deposited state of the mercury (i.e., saturation operating mode), the halogen cycle was able to be maintained by encapsulating the halogen into the internal space with an excessive volume with respect to the capacity of the internal space. Additionally, the inventors found that "blackening temperature", at which remarkable blackening occurs on the inner wall of the arc tube part, exists in a temperature range lower than the deposition temperature.

According to the present invention, by keeping the internal space of a high-pressure discharge lamp, in which an excessive volume of halogen is encapsulated, at a higher temperature than the blackening temperature, it is possible to provide a method for lighting a high-pressure discharge lamp. The method is configured to determine a power to be supplied to the high-pressure discharge lamp in accordance with a luminance parameter of an image content. Therefore a good contrast can be always obtained without temporarily changing a saturation operating mode into an unsaturation operating mode even when the saturation operating mode continues for a long period of time. In the saturation operating mode, the temperature of the internal space becomes lower than the deposition temperature of mercury.

DETAILED DESCRIPTION OF EMBODIMENTS

Explanation will be hereinafter made for practical examples regarding a high-pressure discharge lamp 10 to which the present invention is applied and a lighting circuit 100 for lighting the high-pressure discharge lamp 10.

Figure 1:
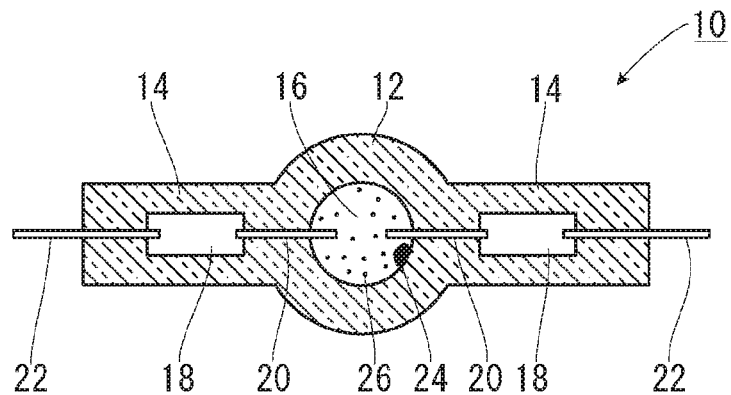
FIG. 1 is a diagram showing an embodiment of a high-pressure discharge lamp to which the present invention is applied.

First, the high-pressure discharge lamp 10 will be explained. As shown in FIG. 1, the high-pressure discharge lamp 10 includes an arc tube part 12 and a pair of sealed parts 14. The arc tube part 12 and the sealed parts 14 are integrally made of silica glass. The sealed parts 14 extend from the arc tube part 12. An internal space 16 is formed in the arc tube part 12, and is sealed by the sealed parts 14. Additionally, foils 18 made of molybdenum are respectively embedded in the sealed parts 14. It should be noted that although not illustrated in the drawings, a high pressure discharge lamp having only one sealed part 14 may be used.

Moreover, the high-pressure discharge lamp 10 is provided with a pair of electrodes 20 made of tungsten and a pair of lead rods 22. One end of each electrode 20 is connected to one end of each foil 18, whereas the other end thereof is disposed inside the internal space 16. One end of each lead rod 22 is connected to the other end of each foil 18, whereas the other end thereof extends to the outside from each sealed part 14. Additionally, a predetermined volume of mercury 24 and a predetermined volume of halogen 26 (e.g., bromine) are encapsulated in the internal space 16.

When predetermined high voltage is applied to the pair of lead rods 22 mounted to the high-pressure discharge lamp 10, a glow discharge starts between the pair of electrodes 20 mounted to the internal space 16 of the arc tube part 12. Afterwards, the glow discharge transitions to an arc discharge. The mercury 24 is evaporated/excited by the arc and emits light rays. In other words, the internal space 16 of the arc tube part 12 also functions as "a discharge space". It should be noted that in FIG. 1, a black part denoted with reference numeral 24 indicates mercury in a deposited state.

Explanation will be herein made for the volumes of the mercury 24 and the halogen 26 encapsulated in the internal space 16 of the arc tube part 12 of the high-pressure discharge lamp 10. In the high-pressure discharge lamp 10 according to the present embodiment, compared to a well-known high-pressure discharge lamp, the encapsulated volume of the halogen 26 is excessive with respect to the capacity of the internal space 16 of the arc tube part such that an appropriate halogen cycle is established while a part of the mercury 24 deposits (condenses) without vaporizing. The term "well-known high-pressure discharge lamp" herein refers to a high-pressure discharge lamp in which an appropriate volume of halogen is encapsulated in the internal space of an arc tube part such that an appropriate halogen cycle can be established while mercury encapsulated in the internal space entirely evaporates.

Next, brief explanation will be made for the halogen cycle. Tungsten, of which the electrodes 20 are made, sublimates when the electrodes 20 are heated to a high temperature through electric conduction. The sublimated tungsten binds with the halogen 26 in the vicinity of the inner wall surface of the arc tube part 12, and thus, tungsten halide is formed. While in a gaseous state, tungsten halide returns to the vicinity of the electrodes 20. Tungsten halide, returned to the vicinity of the electrodes 20, is separated into tungsten and halogen when heated to 1400 degrees Celsius or greater. The separated tungsten returns to the electrodes 20 again. On the other hand, the separated halogen returns to the vicinity of the inner wall surface of the arc tube part 12 again and binds with other tungsten. With such a halogen cycle being continuously performed, it is possible to inhibit wearing of the electrodes 20 and/or occurrence of blackening attributed to tungsten that sublimates from the electrodes 20 and attaches to the inner wall surface of the arc tube part 12. In other words, unless the volume of halogen 26 bindable with tungsten in the internal space 16 of the arc tube part 12 is appropriate, the halogen cycle is blocked and occurrence of blackening and wearing of the electrodes 20 are expected to rapidly progress.

Incidentally, when the mercury 24 deposits in the internal space 16 of the arc tube part 12, the halogen 26 is inevitably bound into the deposited mercury 24 and is prevented from binding with the sublimated tungsten unlike the above situation. Because of this, chances are that when mercury partially deposits, the volume of halogen bindable with tungsten would be reduced and the halogen cycle would be blocked.

In this regard, in the high-pressure discharge lamp 10 of the present embodiment, the halogen 26 has been preliminarily excessively encapsulated in the internal space 16 of the arc tube part 12 as described above. Thus, even when the high-pressure discharge lamp 10 is normally lit while a state that a part of the mercury 24 deposits in the internal space 16 of the arc tube part 12 is maintained, this does not block the halogen cycle as long as the volume of halogen 26 is appropriate so as to be bindable with tungsten that remains in the internal space 16 without being bound into the mercury 24.

However, when the temperature of the internal space 16 becomes too low, an excessive volume of the mercury 24 inevitably deposits and the volume of the halogen 26 bindable with tungsten is accordingly reduced by that much. In other words, even if the halogen 26 is excessively encapsulated in the internal space 16, the temperature of the internal space 16 reaches "blackening temperature" when gradually lowered to some extent. The blackening temperature is a temperature at which remarkable blackening occurs on the inner wall of the arc tube part 12. The blackening temperature depends on a balance between the rate of the mercury 24 encapsulated in the arc tube part 12 and that of the halogen 26 encapsulated in the arc tube part 12.

Therefore, even when the saturation operating mode, in which the temperature of the internal space 16 becomes lower than the deposition temperature of the mercury 24, is performed by output power determined in accordance with the luminance parameter of an image content and is continued for a long period of time, it is possible to avoid occurrence of remarkable blackening on the inner wall of the arc tube part 12 by keeping the temperature of the internal space 16 higher than the blackening temperature. It should be noted that the term "long period of time" can be referred to as 50 hours employed in an example to be described, but is not limited to this.

In some cases, it is realistically difficult to directly measure the temperature of the internal space 16 of the arc tube part 12 in the high-pressure discharge lamp 10 with a thermocouple or so forth on a real-time basis in order to check whether or not the temperature of the internal space 16 is higher than the blackening temperature. Hence, as described in the following "Experimental Data", supply power was gradually lowered when supplied to a plurality of high-pressure discharge lamps 10 having different settings of the encapsulated rate of the mercury 24 or the halogen 26.

As a result, it was found that even in the high-pressure discharge lamps 10 having different settings of rated power, the temperature of the internal space 16 became the blackening temperature at the same setting/settings of the rate of supply power to rated power as long as the encapsulated rate of the mercury 24 and that of the halogen 26 were equally set for the high-pressure discharge lamps 10. In other words, the internal space 16 can be kept at a higher temperature than the blackening temperature regardless of the settings of the rated power for the high-pressure discharge lamps 10 when the lowest power to be supplied to each high-pressure discharge lamp 10 is set to be greater than or equal to a predetermined ratio to the rated power set for each of the high-pressure discharge lamps 10.

(Experimental Data)

Explanation will be made for experimental results in conditions that the encapsulated rate of the mercury 24, the encapsulated rate of the halogen 26, and power to be supplied to the high-pressure discharge lamp 10 were variously set in the high-pressure discharge lamp 10 of the present invention. It should be noted that in the specification of the present application, the term "encapsulated rate of mercury" refers to a value ($mg/mm^3$) to be obtained by dividing the weight (mg) of mercury encapsulated in the arc tube part 12 by the capacity ($mm^3$) of the internal space 16 of the arc tube part 12. On the other hand, the term "encapsulated rate of halogen" is a value ($\mu mol/mm^3$) to be obtained by dividing the amount of substance ($\mu mol$) of halogen encapsulated in the arc tube part 12 by the capacity ($mm^3$) of the internal space 16 of the arc tube part 12.

On the other hand, power to be supplied to the high-pressure discharge lamp 10 is expressed by "ratio of supply power to rated power (as percentage of rated power)". For example, when a rated power of 240 W is set for the high-pressure discharge lamp 10, "output power: 50% of rated power" means a condition that a power of 120 W was supplied to the high-pressure discharge lamp 10, whereas "output power: 25% of rated power" means a condition that a power of 60 W was supplied to the high-pressure discharge lamp 10.

As shown in Tables 1 to 8, an experiment was conducted in 13 conditions using two types of high-pressure discharge lamps 10, for one of which the rated power was set to be 240 W and for the other of which the rated power was set to be 200 W. One of the two types of the high-pressure discharge lamps 10 used in the experiment was the one that the rated power was set to be 240 W and had the following specs: the capacity of the internal space 16 of the arc tube part 12 was 55 $mm^3$; the internal surface area of the arc tube part 12 was 81 $mm^2$; and the tube wall load was 3.0 $W/mm^2$. On the other hand, the other of the two types of the high-pressure discharge lamps 10 used in the experiment was the one that the rated power was set to be 200 W and had the following specs: the capacity of the internal space 16 of the arc tube part 12 was 50 $mm^3$; the internal surface area of the arc tube part 12 was 77 $mm^2$; and the tube wall load was 2.6 $W/mm^2$. It should be noted that in general, the encapsulated rate of halogen in a well-known high-pressure discharge lamp is $1 \times 10^{-4}$ $\mu mol/mm^3$.

It should be noted that in the specification of the present application, the term "rated power of high-pressure discharge lamp" refers to the highest power to be supplied to the high-pressure discharge lamp 10 from, for instance, a projector when the high-pressure discharge lamp 10 is used in the projector. The term "rated power of high-pressure discharge lamp" will be herein specifically explained with the example of the projector. When the projector is provided with, for instance, "normal mode" and "ECO (economy) mode" for lighting the high-pressure discharge lamp 10 with lower power than "normal mode", supply power in projecting "entirely white screen" by "normal mode" corresponds to "rated power of high-pressure discharge lamp".

On the other hand, the term "power" does not refer to power in a short period of time such as power at the moment that a ripple current, occurring in a shorter period than the frequency of supply power, reaches its upper/lower limit and power at the moment that a pulse current, configured to be applied to brighten a predetermined color or inhibit flickering of light to be projected from a projector, reaches its upper/lower limit. Instead, the term "power" refers to average power in a relatively long period of time including power corresponding to a ripple current and power corresponding to a pulse current.

Table 1 shows comprehensive results in the experiment conducted for the high-pressure discharge lamp 10 for which the rated power was set to be 240 W under the conditions that the encapsulated rate of the halogen 26 was set constant at $1 \times 10^{-4}$ μmol/mm³ whereas the encapsulated rate of the mercury 24 and supply power were variously changed.

Table 2 shows comprehensive results in the experiment conducted for the high-pressure discharge lamp 10 for which the rated power was set to be 240 W under the conditions that the encapsulated rate of the halogen 26 was set constant at $5 \times 10^{-4}$ μmol/mm³ whereas the encapsulated rate of the mercury 24 and supply power were variously changed.

Table 3 shows comprehensive results in the experiment conducted for the high-pressure discharge lamp 10 for which the rated power was set to be 240 W under the conditions that the encapsulated rate of the halogen 26 was set constant at $10 \times 10^{-4}$ μmol/mm³ whereas the encapsulated rate of the mercury 24 and supply power were variously changed.

Table 4 shows comprehensive results in the experiment conducted for the high-pressure discharge lamp 10 for which the rated power was set to be 240 W under the conditions that the encapsulated rate of the halogen 26 was set constant at $20 \times 10^{-4}$ μmol/mm³ whereas the encapsulated rate of the mercury 24 and supply power were variously changed, and that the encapsulated rate of the halogen 26 was set constant at $30 \times 10^{-4}$ μmol/mm³ whereas the encapsulated rate of the mercury 24 and supply power were variously changed.

Table 5 shows comprehensive results in the experiment conducted for the high-pressure discharge lamp 10 for which the rated power was set to be 200 W under the conditions that the encapsulated rate of the halogen 26 was set constant at $1 \times 10^{-4}$ μmol/mm³ whereas the encapsulated rate of the mercury 24 and supply power were variously changed.

Table 6 shows comprehensive results in the experiment conducted for the high-pressure discharge lamp 10 for which the rated power was set to be 200 W under the conditions that the encapsulated rate of the halogen 26 was set constant at $5 \times 10^{-4}$ μmol/mm³ whereas the encapsulated rate of the mercury 24 and supply power were variously changed.

Table 7 shows comprehensive results in the experiment conducted for the high-pressure discharge lamp 10 for which the rated power was set to be 200 W under the conditions that the encapsulated rate of the halogen 26 was set constant at $10 \times 10^{-4}$ μmol/mm³ whereas the encapsulated rate of the mercury 24 and supply power were variously changed.

Table 8 shows comprehensive results in the experiment conducted for the high-pressure discharge lamp 10 for which the rated power was set to be 200 W under the conditions that the encapsulated rate of the halogen 26 was set constant at $20 \times 10^{-4}$ μmol/mm³ whereas the encapsulated rate of the mercury 24 and supply power were variously changed, and that the encapsulated rate of the halogen 26 was set constant at $30 \times 10^{-4}$ μmol/mm³ whereas the encapsulated rate of the mercury 24 and supply power were variously changed.

It was examined whether or not remarkable blackening occurred on the inner wall of the arc tube part 12 by lighting the respective high-pressure discharge lamps 10 continuously for 50 hours under the respective conditions. A given experimental result was evaluated as "OK" when remarkable blackening did not occur at the point of time that continuous lighting time reached 50 hours. On the other hand, a given experimental result was evaluated as "NG" when remarkable blackening occurred at the point of time that continuous lighting time reached 50 hours. It should be noted that in the specification of the present application, the term "remarkable blackening" means that blackening occurs in more than one-third of the entire area of the inner wall of the arc tube part 12. When blackening occurs in more than one-third of the entire area of the inner wall of the arc tube part 12, it is concerned that the blacked part results in local temperature increase in the arc tube part 12, and this causes burst and damage of the arc tube part 12.

The mercury 24 was encapsulated into the internal space 16 of the arc tube part 12 by the following method. First, one end of the arc tube part 12 was sealed with one sealed part 14. Then, a predetermined volume of the mercury 24 was squeezed out of a syringe filled with the mercury 24, and was injected into the internal space 16 of the arc tube part 12. Finally, the internal space 16 was sealed with the other sealed part 14. Further, the weight of the mercury 24 actually encapsulated was checked by the following method. First, the weight of a bulb (i.e., a state of the arc tube part 12 with one sealed part 14 being formed) was measured in a condition that the mercury 24 was contained therein. Then, the mercury 24 was completely evaporated by heating the bulb and was discharged from the bulb. The weight of the bulb was re-measured in a condition that the mercury 24 was not contained therein. Finally, the weight of the mercury 24 was obtained by calculating a difference between the weight of the bulb in pre-evaporation of the mercury 24 and that in post-evaporation of the mercury 24.

Bromine (Br) was used as the halogen 26. The halogen 26 was encapsulated into the internal space 16 of the arc tube part 12 by the following method. First, the one end of the arc tube part 12 was sealed with the one sealed part 14. Then, the halogen 26 was introduced into the internal space 16 of the arc tube part 12. Finally, the internal space 16 was sealed with the other sealed part 14. Further, the volume of the halogen 26 actually encapsulated was checked by ion chromatography.

TABLE 1

| | 240 W | | |
|---|---|---|---|
| | ENCAPSULATED RATE OF HALOGEN | | |
| | $1 \times 10^{-4}$ μmol/mm³ | $1 \times 10^{-4}$ μmol/mm³ | $1 \times 10^{-4}$ μmol/mm³ |
| SUPPLY | ENCAPSULATED RATE OF MERCURY | | |
| POWER: | 0.27 mg/mm³ | 0.33 mg/mm³ | 0.36 mg/mm³ |
| 50% OF RATED POWER | OK | OK | OK |
| 42% | OK | OK | OK |
| 33% | OK | OK | OK |
| 29% | OK | OK | NG |
| 25% | OK | NG | NG |

TABLE 1-continued

240 W

| SUPPLY POWER: | ENCAPSULATED RATE OF HALOGEN | | |
|---|---|---|---|
| | $1 \times 10^{-4}$ µmol/mm³ | $1 \times 10^{-4}$ µmol/mm³ | $1 \times 10^{-4}$ µmol/mm³ |
| | ENCAPSULATED RATE OF MERCURY | | |
| | 0.27 mg/mm³ | 0.33 mg/mm³ | 0.36 mg/mm³ |
| 21% | NG | NG | NG |
| 17% | NG | NG | NG |
| 15% | NG | NG | NG |
| 13% | NG | NG | NG |
| 10% | NG | NG | NG |

TABLE 2

240 W

| SUPPLY POWER: | ENCAPSULATED RATE OF HALOGEN | | |
|---|---|---|---|
| | $5 \times 10^{-4}$ µmol/mm³ | $5 \times 10^{-4}$ µmol/mm³ | $5 \times 10^{-4}$ µmol/mm³ |
| | ENCAPSULATED RATE OF MERCURY | | |
| | 0.27 mg/mm³ | 0.33 mg/mm³ | 0.36 mg/mm³ |
| 50% OF RATED POWER | OK | OK | OK |
| 42% | OK | OK | OK |
| 33% | OK | OK | OK |
| 29% | OK | OK | OK |
| 25% | OK | OK | OK |
| 21% | OK | OK | NG |
| 17% | OK | NG | NG |
| 15% | NG | NG | NG |
| 13% | NG | NG | NG |
| 10% | NG | NG | NG |

TABLE 3

240 W

| SUPPLY POWER: | ENCAPSULATED RATE OF HALOGEN | | |
|---|---|---|---|
| | $10 \times 10^{-4}$ µmol/mm³ | $10 \times 10^{-4}$ µmol/mm³ | $10 \times 10^{-4}$ µmol/mm³ |
| | ENCAPSULATED RATE OF MERCURY | | |
| | 0.33 mg/mm³ | 0.36 mg/mm³ | 0.40 mg/mm³ |
| 50% OF RATED POWER | OK | OK | OK |
| 42% | OK | OK | OK |
| 33% | OK | OK | OK |
| 29% | OK | OK | OK |
| 25% | OK | OK | OK |
| 21% | OK | OK | OK |
| 17% | OK | OK | NG |
| 15% | OK | NG | NG |
| 13% | NG | NG | NG |
| 10% | NG | NG | NG |

TABLE 4

240 W

| SUPPLY POWER: | ENCAPSULATED RATE OF HALOGEN | | | |
|---|---|---|---|---|
| | $20 \times 10^{-4}$ µmol/mm³ | $20 \times 10^{-4}$ µmol/mm³ | $30 \times 10^{-4}$ µmol/mm³ | $30 \times 10^{-4}$ µmol/mm³ |
| | ENCAPSULATED RATE OF MERCURY | | | |
| | 0.36 mg/mm³ | 0.40 mg/mm³ | 0.40 mg/mm³ | 0.45 mg/mm³ |
| 50% OF RATED POWER | OK | OK | OK | OK |
| 42% | OK | OK | OK | OK |
| 33% | OK | OK | OK | OK |
| 29% | OK | OK | OK | OK |
| 25% | OK | OK | OK | OK |
| 21% | OK | OK | OK | OK |
| 17% | OK | OK | OK | OK |
| 15% | OK | NG | OK | OK |
| 13% | NG | NG | OK | NG |
| 10% | NG | NG | NG | NG |

TABLE 5

200 W

| SUPPLY POWER: | ENCAPSULATED RATE OF HALOGEN | | |
|---|---|---|---|
| | $1 \times 10^{-4}$ µmol/mm³ | $1 \times 10^{-4}$ µmol/mm³ | $1 \times 10^{-4}$ µmol/mm³ |
| | ENCAPSULATED RATE OF MERCURY | | |
| | 0.27 mg/mm³ | 0.33 mg/mm³ | 0.36 mg/mm³ |
| 50% OF RATED POWER | OK | OK | OK |
| 42% | OK | OK | OK |
| 33% | OK | OK | OK |
| 29% | OK | OK | NG |
| 25% | OK | NG | NG |
| 21% | NG | NG | NG |
| 17% | NG | NG | NG |
| 15% | NG | NG | NG |
| 13% | NG | NG | NG |
| 10% | NG | NG | NG |

TABLE 6

200 W

| SUPPLY POWER: | ENCAPSULATED RATE OF HALOGEN | | |
|---|---|---|---|
| | $5 \times 10^{-4}$ µmol/mm³ | $5 \times 10^{-4}$ µmol/mm³ | $5 \times 10^{-4}$ µmol/mm³ |
| | ENCAPSULATED RATE OF MERCURY | | |
| | 0.27 mg/mm³ | 0.33 mg/mm³ | 0.36 mg/mm³ |
| 50% OF RATED POWER | OK | OK | OK |
| 42% | OK | OK | OK |
| 33% | OK | OK | OK |
| 29% | OK | OK | OK |
| 25% | OK | OK | OK |
| 21% | OK | OK | NG |
| 17% | OK | NG | NG |
| 15% | NG | NG | NG |
| 13% | NG | NG | NG |
| 10% | NG | NG | NG |

TABLE 7

200 W

| SUPPLY POWER: | ENCAPSULATED RATE OF HALOGEN | | |
|---|---|---|---|
| | $10 \times 10^{-4}$ µmol/mm$^3$ | $10 \times 10^{-4}$ µmol/mm$^3$ | $10 \times 10^{-4}$ µmol/mm$^3$ |
| | ENCAPSULATED RATE OF MERCURY | | |
| | 0.33 mg/mm$^3$ | 0.36 mg/mm$^3$ | 0.40 mg/mm$^3$ |
| 50% OF RATED POWER | OK | OK | OK |
| 42% | OK | OK | OK |
| 33% | OK | OK | OK |
| 29% | OK | OK | OK |
| 25% | OK | OK | OK |
| 21% | OK | OK | OK |
| 17% | OK | OK | NG |
| 15% | OK | NG | NG |
| 13% | NG | NG | NG |
| 10% | NG | NG | NG |

TABLE 8

200 W

| SUPPLY POWER: | ENCAPSULATED RATE OF HALOGEN | | | |
|---|---|---|---|---|
| | $20 \times 10^{-4}$ µmol/mm$^3$ | $20 \times 10^{-4}$ µmol/mm$^3$ | $30 \times 10^{-4}$ µmol/mm$^3$ | $30 \times 10^{-4}$ µmol/mm$^3$ |
| | ENCAPSULATED RATE OF MERCURY | | | |
| | 0.36 mg/mm$^3$ | 0.40 mg/mm$^3$ | 0.40 mg/mm$^3$ | 0.45 mg/mm$^3$ |
| 50% OF RATED POWER | OK | OK | OK | OK |
| 42% | OK | OK | OK | OK |
| 33% | OK | OK | OK | OK |
| 29% | OK | OK | OK | OK |
| 25% | OK | OK | OK | OK |
| 21% | OK | OK | OK | OK |
| 17% | OK | OK | OK | OK |
| 15% | OK | NG | OK | OK |
| 13% | NG | NG | OK | NG |
| 10% | NG | NG | NG | NG |

As a result of the experiment, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.45 mg/mm$^3$, the encapsulated rate of the halogen 26 was set to be greater than or equal to $1 \times 10^{-4}$ µmol/mm$^3$ and less than or equal to $30 \times 10^{-4}$ µmol/mm$^3$, and the lowest power to be supplied to each type of the high-pressure discharge lamp 10 was set to be 33% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.36 mg/mm$^3$, the encapsulated rate of the halogen 26 was set to be greater than or equal to $5 \times 10^{-4}$ µmol/mm$^3$ and less than or equal to $20 \times 10^{-4}$ µmol/mm$^3$, and the lowest power to be supplied to each type of the high-pressure discharge lamp 10 was set to be 25% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.33 mg/mm$^3$, the encapsulated rate of the halogen 26 was set to be greater than or equal to $5 \times 10^{-4}$ µmol/mm$^3$ and less than or equal to $10 \times 10^{-4}$ µmol/mm$^3$, and the lowest power to be supplied to each type of the high-pressure discharge lamp 10 was set to be 21% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.33 mg/mm$^3$ and less than or equal to 0.36 mg/mm$^3$, the encapsulated rate of the halogen 26 was set to be greater than or equal to $10 \times 10^{-4}$ µmol/mm$^3$ and less than or equal to $20 \times 10^{-4}$ µmol/mm$^3$, and the lowest power to be supplied to each type of the high-pressure discharge lamp 10 was set to be 17% or greater of the rated power.

Moreover, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.33 mg/mm$^3$, the encapsulated rate of the halogen 26 was set to be greater than or equal to $1 \times 10^{-4}$ µmol/mm$^3$ and less than or equal to $10 \times 10^{-4}$ µmol/mm$^3$, and the lowest power to be supplied to each type of the high-pressure discharge lamp 10 was set to be 29% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.33 mg/mm$^3$ and less than or equal to 0.40 mg/mm$^3$, the encapsulated rate of the halogen 26 was set to be greater than or equal to $10 \times 10^{-4}$ µmol/mm$^3$ and less than or equal to $30 \times 10^{-4}$ µmol/mm$^3$, and the lowest power to be supplied to each type of the high-pressure discharge lamp 10 was set to be 21% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.36 mg/mm$^3$ and less than or equal to 0.45 mg/mm$^3$, the encapsulated rate of the halogen 26 was set to be greater than or equal to $20 \times 10^{-4}$ μmol/mm$^3$ and less than or equal to $30 \times 10^{-4}$ μmol/mm$^3$, and the lowest power to be supplied to each type of the high-pressure discharge lamp 10 was set to be 17% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.33 mg/mm$^3$, the encapsulated rate of the halogen 26 was set to be greater than or equal to $10 \times 10^{-4}$ μmol/mm$^3$ and less than or equal to $30 \times 10^{-4}$ μmol/mm$^3$, and the lowest power to be supplied to each type of the high-pressure discharge lamp 10 was set to be 15% or greater of the rated power.

Additionally, it was found that in lighting the both types of the high-pressure discharge lamps 10, for one of which the rated power was set to be 240 W and for the other of which the rated power was set to be 200 W, the temperature of the internal space 16 in the arc tube part 12 was able to avoid from becoming the blackening temperature or less, and simultaneously, remarkable blackening did not occur for a long period of time, when the encapsulated rate of the mercury 24 was set to be greater than or equal to 0.27 mg/mm$^3$ and less than or equal to 0.36 mg/mm$^3$, the encapsulated rate of the halogen 26 was set to be greater than or equal to $20 \times 10^{-4}$ μmol/mm$^3$ and less than or equal to $30 \times 10^{-4}$ μmol/mm$^3$, and the lowest power to be supplied to each type of the high-pressure discharge lamp 10 was set to be 15% or greater of the rated power.

Incidentally, the encapsulated rate of the mercury 24 was set to be greater than or equal to 0.27 mg/mm$^3$ due to the following concern: in using the both types of the high-pressure discharge lamps 10 as light sources of projectors, the amount of light required for them cannot be satisfied when the encapsulated rate of the mercury 24 is set to be less than 0.27 mg/mm$^3$.

Additionally, the encapsulated rate of the mercury 24 was set to be less than or equal to 0.45 mg/mm$^3$ due to the following concern: in lighting the both types of the high-pressure discharge lamps 10 under a condition that the encapsulated rate of the mercury 24 is set to be greater than 0.45 mg/mm$^3$, the volume of the vaporized mercury 24 increases, accordingly the pressure of the internal space 16 becomes too high, and the arc tube part 12 cannot endure the high pressure.

On the other hand, the encapsulated rate of the halogen 26 was set to be greater than or equal to $1 \times 10^{-4}$ μmol/mm$^3$ due to the following concern: in a condition that the encapsulated rate of the halogen 26 is set to be less than $1 \times 10^{-4}$ μmol/mm$^3$, even by setting the encapsulated rate of the mercury 24 to be 0.27 mg/mm$^3$ that is the lowest rate, the halogen cycle cannot be established in the saturation operating mode in which part of the mercury 24 deposits.

Additionally, the encapsulated rate of the halogen 26 was set to be less than or equal to $30 \times 10^{-4}$ μmol/mm$^3$ due to the following concern: in a condition that the encapsulated rate of the halogen 26 is set to be greater than $30 \times 10^{-4}$ μmol/mm$^3$, other problems are caused such as degradation in throughput yield in manufacturing the high-pressure discharge lamps 10 and corrosion of the electrodes 20 by an excessive volume of the halogen 26.

Moreover, as a result of the experiment, it was found that in lighting the both types of the high-pressure discharge lamps 10 with the aforementioned respective settings of the lowest power, the temperature of the arc tube part 12 fell in a range of greater than or equal to 650 degrees Celsius and less than 750 degrees Celsius. Therefore, it is preferred to set the lowest temperature of the arc tube part 12 to be greater than or equal to 650 degrees Celsius and less than 750 degrees Celsius in the respective conditions.

It should be noted that it is difficult to directly measure the temperature of the internal space 16 in the arc tube part 12. Therefore, in the aforementioned experiment, the temperature of the upper surface of the arc tube part 12 (i.e., the outer surface of the vertically upper region of the arc tube part 12 in lighting the both types of the high-pressure discharge lamps 10) was measured with a thermocouple. In the present specification, the temperature of the upper surface of the arc tube part 12 thus measured refers to "an arc tube part temperature".

Figure 2:
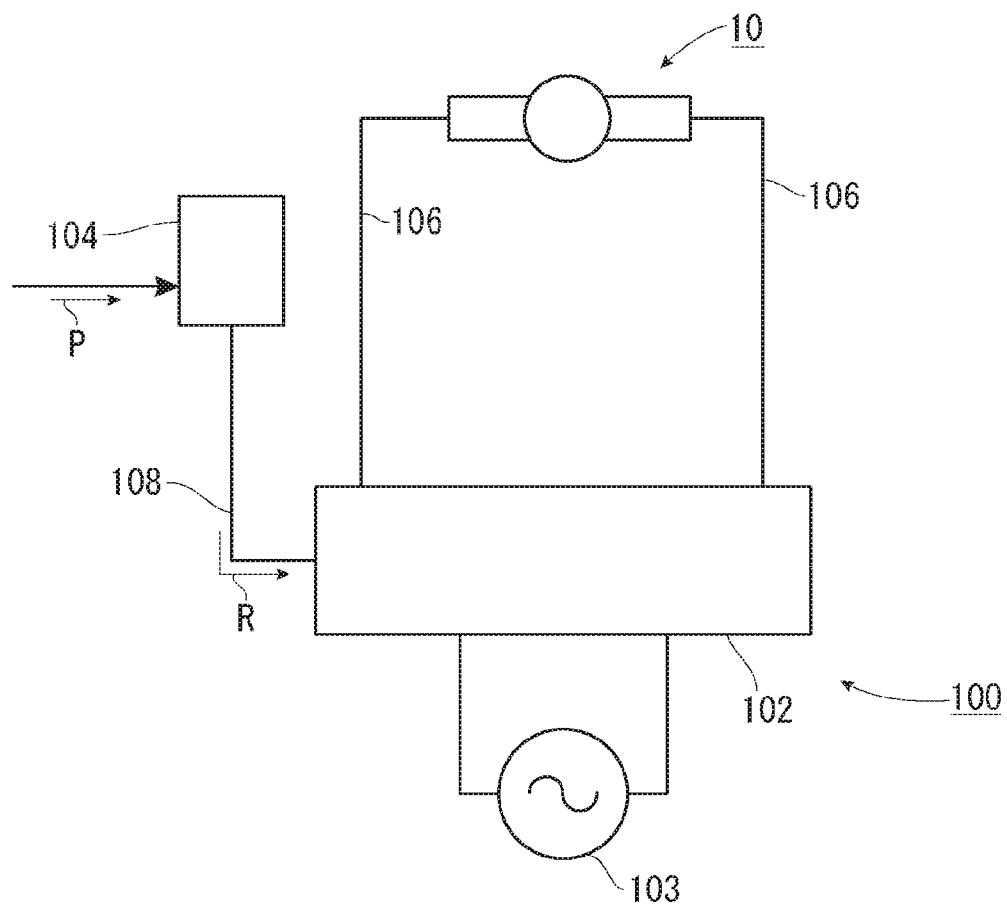
FIG. 2 is a diagram showing an embodiment of a lighting circuit for lighting the high-pressure discharge lamp to which the present invention is applied.

Next, explanation will be made for an example configuration to light the high-pressure discharge lamp 10 according to the present example by changing power to be supplied to the high-pressure discharge lamp 10 in accordance with the luminance parameter of an image content. As exemplified in FIG. 2, the lighting circuit 100, capable of implementing this lighting method, includes at least a power supply circuit 102 and power signal transmission means 104.

The power supply circuit 102 is a circuit configured to convert power received from a power source 103 into voltage and current suitable for lighting the high-pressure discharge lamp 10 and then supply the voltage and current to the high-pressure discharge lamp 10 through a pair of leads 106.

The power signal transmission means 104 is configured to receive a luminance parameter signal P from the outside and determine the magnitude of power in accordance with the luminance parameter signal P. Afterwards, the power signal transmission means 104 is configured to generate a power signal R in accordance with the determined magnitude of power and transmit the power signal R to the power supply circuit 102 through a power signal transmission line 108.

When receiving the power signal R, the power supply circuit 102 is configured to change or maintain the value of current A to be supplied to the high-pressure discharge lamp 10 in accordance with the instruction of the power signal R.

Figure 3:
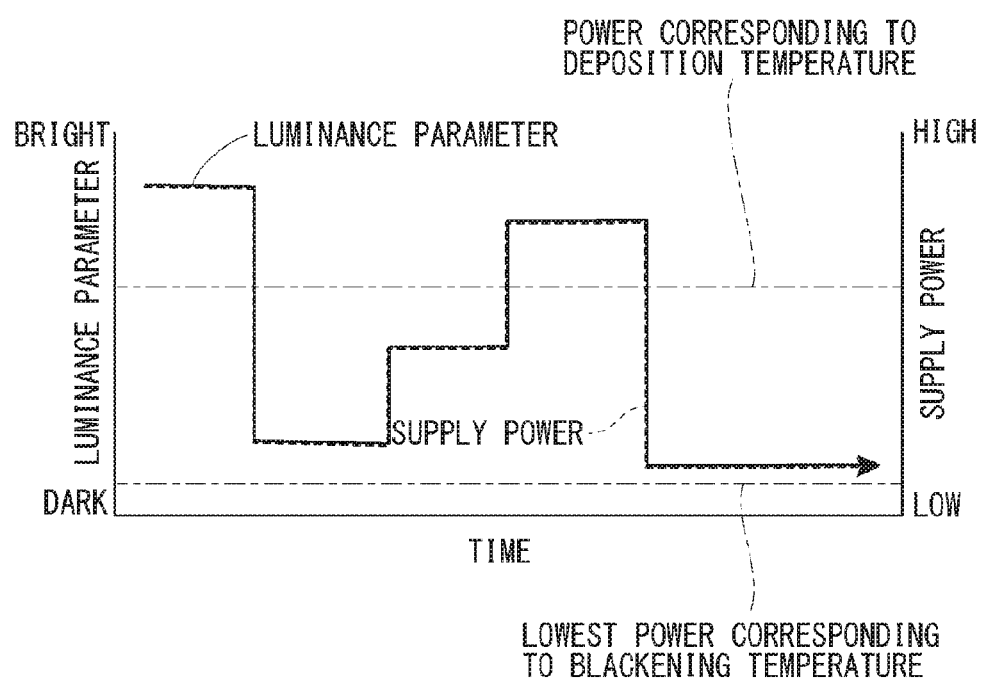
FIG. 3 is a chart showing an example of the increase-decrease pattern of a luminance parameter and that of supply power in a condition that the high-pressure discharge lamp is lit with a lighting method according to the present invention.

When the power to be supplied to the high-pressure discharge lamp 10 is thus changed in accordance with the luminance parameter of the image content, the increase-decrease pattern of the luminance parameter and that of the supply power are matched as shown in FIG. 3.

The lowest power, preliminarily determined in accordance with the encapsulated rates of the mercury 24 and the halogen 26 in the high-pressure discharge lamp 10, is set in the power signal transmission means 104. Thus, even when a darkest screen is requested by the value of the luminance parameter, the power signal transmission means 104 is configured to prevent power, corresponding to the power signal R configured to be transmitted to the power supply circuit 102, from becoming lower than or equal to this lowest power.

Accordingly, it is possible to keep the internal space 16 of the high-pressure discharge lamp 10, in which an excessive volume of the halogen 26 is encapsulated, at a higher temperature than the blackening temperature. Hence, the power to be supplied to the high-pressure discharge lamp 10 can be always determined in accordance with the luminance parameter of the image content. Additionally, even when the saturation operating mode, in which the temperature of the internal space 16 becomes lower than the deposition temperature of the mercury 24, continues for a long period of time, the saturation operating mode is not required to be temporarily changed into the unsaturation operating mode. Hence, a good contrast can be always obtained.

(Modifications)

In the aforementioned example, the lowest power to be supplied to the high-pressure discharge lamp 10 is configured to be set in accordance with the encapsulated rates of the mercury 24 and the halogen 26. Alternatively to this, the temperature of the arc tube part 12 may be configured to be measured and monitored in the high-pressure discharge lamp 10 during lighting so as to avoid the temperature of the internal space 16 in the arc tube part 12 from becoming lower than or equal to the blackening temperature.

Additionally, two types of the high-pressure discharge lamps 10, for one of which the rated power was set to be 240 W and for the other of which the rated power was set to be 200 W, were used in the aforementioned experiment. However, the settings of the rated power for the high-pressure discharge lamps 10 are not limited to the above. For example, it can be assumed to set the rated power to be any suitable value in a range from 180 W to 400 W.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A method for lighting a high-pressure discharge lamp, the method being configured to change a power to be supplied to the high-pressure discharge lamp in accordance with a luminance parameter of an image content, wherein
    the high-pressure discharge lamp includes an arc tube part having an internal space in which a pair of electrodes is disposed in opposition to each other and in which mercury and halogen are encapsulated,
    the halogen is encapsulated in the internal space with an excessive volume with respect to a capacity of the internal space such that a halogen cycle is established when part of the mercury deposits without vaporizing, and
    the internal space is configured to be kept at a higher temperature than a blackening temperature, the blackening temperature being lower than a deposition temperature of the mercury, the blackening temperature causing blackening in more than one-third of an entire area of an inner wall of the arc tube part.

2. A method for lighting a high-pressure discharge lamp, the method being configured to change a power to be supplied to the high-pressure discharge lamp in accordance with a luminance parameter of an image content, wherein
    the high-pressure discharge lamp includes an arc tube part having an internal space in which a pair of electrodes is disposed in opposition to each other and in which mercury and halogen are encapsulated,
    the halogen is encapsulated in the internal space with an excessive volume with respect to a capacity of the internal space such that a halogen cycle is established when part of the mercury deposits without vaporizing, and
    the internal space is configured to be kept at a higher temperature than a blackening temperature by setting a lowest power to be supplied to the high-pressure discharge lamp to be greater than or equal to a predetermined percentage of a rated power set for the high-pressure discharge lamp, the blackening temperature being lower than a deposition temperature of the mercury, the blackening temperature causing blackening in more than one-third of an entire area of an inner wall of the arc tube part.

3. The method according to claim 2, wherein
    in the high-pressure discharge lamp, an encapsulated rate of the mercury is greater than or equal to 0.27 mg/mm$^3$ and less than or equal to 0.45 mg/mm$^3$ and an encapsulated rate of the halogen is greater than or equal to $1\times10^{-4}$ µmol/mm$^3$ and less than or equal to $30\times10^{-4}$ µmol/mm$^3$, and
    the lowest power is set to be greater than or equal to 33% of the rated power set for the high-pressure discharge lamp.

4. The method according to claim 2, wherein
    in the high-pressure discharge lamp, an encapsulated rate of the mercury is greater than or equal to 0.27 mg/mm$^3$ and less than or equal to 0.36 mg/mm$^3$ and an encapsulated rate of the halogen is greater than or equal to $5\times10^{-4}$ µmol/mm$^3$ and less than or equal to $20\times10^{-4}$ µmol/mm$^3$, and
    the lowest power is set to be greater than or equal to 25% of the rated power set for the high-pressure discharge lamp.

5. The method according to claim 2, wherein
    in the high-pressure discharge lamp, an encapsulated rate of the mercury is greater than or equal to 0.27 mg/mm$^3$ and less than or equal to 0.33 mg/mm$^3$ and an encapsulated rate of the halogen is greater than or equal to $5\times10^{-4}$ µmol/mm$^3$ and less than or equal to $10\times10^{-4}$ µmol/mm$^3$, and
    the lowest power is set to be greater than or equal to 21% of the rated power set for the high-pressure discharge lamp.

6. The method according to claim 2, wherein
    in the high-pressure discharge lamp, an encapsulated rate of the mercury is greater than or equal to 0.33 mg/mm$^3$ and less than or equal to 0.36 mg/mm$^3$ and an encapsulated rate of the halogen is greater than or equal to $10\times10^{-4}$ µmol/mm$^3$ and less than or equal to $20\times10^{-4}$ µmol/mm$^3$, and
    the lowest power is set to be greater than or equal to 17% of the rated power set for the high-pressure discharge lamp.

* * * * *